(12) United States Patent
Jeong

(10) Patent No.: US 11,265,505 B2
(45) Date of Patent: Mar. 1, 2022

(54) IMAGE SENSING DEVICE FOR REDUCING MISMATCH OCCURRING BETWEEN READOUT CIRCUITS

(71) Applicant: SK hynix Inc., Gyeonggi-do (KR)

(72) Inventor: Hoesam Jeong, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/910,709

(22) Filed: Jun. 24, 2020

(65) Prior Publication Data

US 2021/0185257 A1 Jun. 17, 2021

(30) Foreign Application Priority Data

Dec. 16, 2019 (KR) .................. 10-2019-0167890

(51) Int. Cl.
*H04N 5/378* (2011.01)
*H04N 5/374* (2011.01)

(52) U.S. Cl.
CPC ............. *H04N 5/378* (2013.01); *H04N 5/374* (2013.01)

(58) Field of Classification Search
CPC ............................... H04N 5/378; H04N 5/374
See application file for complete search history.

(56) References Cited

U.S. PATENT DOCUMENTS

2006/0231732 A1* 10/2006 Yan ..................... H04N 5/3658
250/208.1
2006/0268137 A1* 11/2006 Myers .................. H04N 5/3658
348/294
2018/0205886 A1 7/2018 Lee et al.

FOREIGN PATENT DOCUMENTS

KR 10-2018-0084241 7/2018

\* cited by examiner

*Primary Examiner* — Ahmed A Berhan
(74) *Attorney, Agent, or Firm* — IP & T Group LLP

(57) ABSTRACT

An image sensing device includes first to fourth column lines disposed sequentially in a row direction, first and third unit pixel circuits arranged in a first row and coupled to the first and third column lines, respectively, second and fourth unit pixel circuits arranged in a second row and coupled to the second and fourth column lines, respectively, first to fourth readout circuits, a first path change circuit for changing first and second paths so that the first and second unit pixel circuits are coupled to the first and second readout circuits according to a first relationship during a first unit time, and a second path change circuit for changing third and fourth paths so that the third and fourth unit pixel circuits are coupled to the third and fourth readout circuits according to a second relationship during the first unit time.

21 Claims, 19 Drawing Sheets

IMAGE SENSING DEVICE FOR REDUCING MISMATCH OCCURRING BETWEEN READOUT CIRCUITS

CROSS-REFERENCE TO RELATED APPLICATION(S)

This application claims priority under 35 U.S.C. § 119 to Korean Patent Application No. 10-2019-0167890, filed on Dec. 16, 2019, the disclosure of which is incorporated herein by reference in its entirety.

BACKGROUND

1. Field

Various embodiments of the present disclosure relate to a semiconductor design technique, and more particularly, to an image sensing device.

2. Description of the Related Art

Image sensing devices capture images using the photosensitive property of a semiconductor. Generally, there are two types of sensing devices: charge-coupled device (CCD) image sensing devices and complementary metal-oxide semiconductor (CMOS) image sensing devices. Recently, CMOS image sensing devices are widely used because the CMOS image sensing devices allow both analog and digital control circuits to be directly implemented on a single integrated circuit (IC).

SUMMARY

Various embodiments of the present disclosure are directed to an image sensing device that may reduce a mismatch occurring between readout circuits.

In accordance with an embodiment, an image sensing device may include: first to fourth column lines extended in a column direction and disposed sequentially in a row direction; first and third unit pixel circuits arranged in a first row and coupled to the first and third column lines; second and fourth unit pixel circuits arranged in a second row and coupled to the second and fourth column lines; first and second readout circuits corresponding to the first and second unit pixel circuits; third and fourth readout circuits corresponding to the third and fourth unit pixel circuits; a first path change circuit suitable for changing first and second paths between the first and second column lines and the first and second readout circuits based on a first control signal so that the first and second unit pixel circuits are coupled to the first and second readout circuits according to a first relationship during a first unit time; and a second path change circuit suitable for changing third and fourth paths between the third and fourth column lines and the third and fourth readout circuits based on a second control signal so that the third and fourth unit pixel circuits are coupled to the third and fourth readout circuits according to a second relationship, different from the first relationship, during the first unit time.

In accordance with an embodiment, an image sensing device may include: first to fourth column lines extended in a column direction and disposed sequentially in a row direction; a first unit pixel circuit arranged in a first row and coupled to the first column line; a second unit pixel circuit arranged in a second row and coupled to the second column line; a third unit pixel circuit arranged in the first row and coupled to the third column line; a fourth unit pixel circuit arranged in the second row and coupled to the fourth column line; first and second readout circuits corresponding to the first and second unit pixel circuits, respectively; third and fourth readout circuits corresponding to the third and fourth unit pixel circuits, respectively; a first path change circuit suitable for changing first and second paths between the first and second column lines and the first and second readout circuits for each unit time, based on a first control signal; and a second path change circuit suitable for changing third and fourth paths between the third and fourth column lines and the third and fourth readout circuits for each unit time, based on a second control signal.

In accordance with an embodiment, an image sensing device may include: first to fourth column lines extended in a column direction and disposed sequentially in a row direction; a first unit pixel circuit arranged in a first row and coupled to the first column line; a second unit pixel circuit arranged in a second row and coupled to the second column line; a third unit pixel circuit arranged in the first row and coupled to the third column line; a fourth unit pixel circuit arranged in the second row and coupled to the fourth column line; first and second readout circuits corresponding to the first and second unit pixel circuits, respectively; third and fourth readout circuits corresponding to the third and fourth unit pixel circuits, respectively; a first path change circuit suitable for changing first and second paths between the first and second column lines and the first and second readout circuits for each unit time, based on a first control signal; and a second path change circuit suitable for changing third and fourth paths between the third and fourth column lines and the third and fourth readout circuits for each unit time, based on a second control signal, differently from the first path change circuit.

In accordance with an embodiment, an image sensing device may include: first to fourth column lines extended in a column direction and disposed sequentially in a row direction; first and third unit pixel circuits arranged in a first row and coupled to the first and third column lines; second and fourth unit pixel circuits arranged in a second row and coupled to the second and fourth column lines; first and second readout circuits corresponding to the first and second unit pixel circuits, respectively; third and fourth readout circuits corresponding to the third and fourth unit pixel circuits, respectively; a first path change circuit suitable for changing first and second paths between the first and second column lines and the first and second readout circuits based on a first control signal so that the first and second unit pixel circuits are coupled to the first and second readout circuits according to a first relationship during a first unit time; and a second path change circuit suitable for changing third and fourth paths between the third and fourth column lines and the third and fourth readout circuits based on a second control signal so that the third and fourth unit pixel circuits are randomly coupled to the third and fourth readout circuits according to any one of the first relationship and a second relationship during the first unit time.

In accordance with an embodiment, an image sensing device may include: two line groups disposed in a row direction and each having two column lines extending in a column direction; two pixel groups disposed in the row direction and each having two unit pixel circuits disposed in the column direction, the unit pixel circuits in the respective pixel groups being respectively coupled to the column lines in the respective line groups; two readout groups disposed the row direction and each having two readout circuits disposed in the column direction, the readout circuits in the respective readout groups suitable for respectively reading out pixel signals from the unit pixel circuits in the respective pixel groups; and a path control circuitry suitable for controlling paths between the pixel groups and the readout groups to enable a pair of the readout circuits selected from the respective readout groups to output the pixel signals during a unit amount of time.

DETAILED DESCRIPTION

Various embodiments are described below in more detail with reference to the accompanying drawings. These embodiments are provided so that this disclosure is thorough and complete, and fully conveys the scope of the present disclosure to those skilled in the art. Throughout the specification, reference to "an embodiment" or the like is not necessarily to only one embodiment, and different references to any such phrase are not necessarily to the same embodiment(s).

It will be understood that when an element is referred to as being "connected to", or "coupled to" another element, it may be directly on, connected to, or coupled to the other element, or one or more intervening elements may be present. In addition, it will also be understood that the terms "comprises," "comprising," "includes," and "including" when used in this specification, specify the presence of the stated elements and do not preclude the presence or addition of one or more other elements. As used herein, singular forms may include the plural forms as well and vice versa, unless the context clearly indicates otherwise. The articles "a" and "an" as used in this application and the appended claims should generally be construed to mean "one or more" unless specified otherwise or clear from context to be directed to a singular form.

Figure 1:
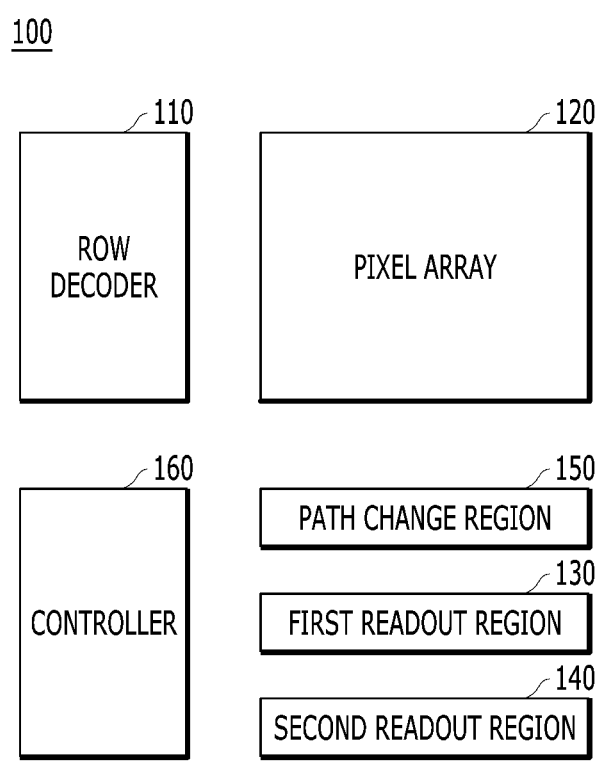
FIG. 1 is a block diagram illustrating an image sensing device in accordance with a first embodiment of the present disclosure.

FIG. 1 is a block diagram illustrating an image sensing device 100 in accordance with a first embodiment of the present disclosure.

Referring to FIG. 1, the image sensing device 100 may include a row decoder 110, a pixel array 120, a first readout region 130, a second readout region 140, a path change region 150 and a controller 160.

The row decoder 110 may control an operation of the pixel array 120. For example, the row decoder 110 may control the pixel array 120 in units of two rows.

The pixel array 120 may include a plurality of pixel circuits arranged at intersections of a plurality of rows and a plurality of columns. The plurality of pixel circuits is described below, particularly with reference to FIG. 2. The pixel array 120 may generate pixel signals under the control of the row decoder 110. For example, the pixel array 120 may generate the pixel signals from the pixel circuits arranged in first and second rows during a first row line time, and generate the pixel signals from the pixel circuits arranged in $(2n-1)^{th}$ and $2n^{th}$ rows during an $n^{th}$ row line time (where "n" is a natural number). The phrase "row line time" indicates the time during which the particular row is activated.

The first readout region 130 may read out half of the pixel signals generated from the pixel array 120. For example, the first readout region 130 may read out the pixel signals generated from half of the pixel circuits arranged in the first row and the pixel signals generated from half of the pixel circuits arranged in the second row, during the first row line time.

The second readout region 140 may read out the other half of the pixel signals generated from the pixel array 120. For example, the second readout region 140 may read out the pixel signals generated from the other half of the pixel circuits arranged in the first row and the pixel signals generated from the other half of the pixel circuits arranged in the second row, during the first row line time.

The path change region 150 may transfer the half of the pixel signals, generated from the pixel array 120, to the first readout region 130, and transfer the other half of the pixel signals, generated from the pixel array 120, to the second readout region 140.

The first readout region 130, the second readout region 140 and the path change region 150 may be disposed on one side of the pixel array 120. Particularly, the path change region 150 may be disposed between the pixel array 120 and the readout regions 130 and 140.

The controller 160 may control overall operations of the row decoder 110, the first and second readout regions 130 and 140 and the path change region 150. For example, the controller 160 may include a timing controller.

Figure 2:
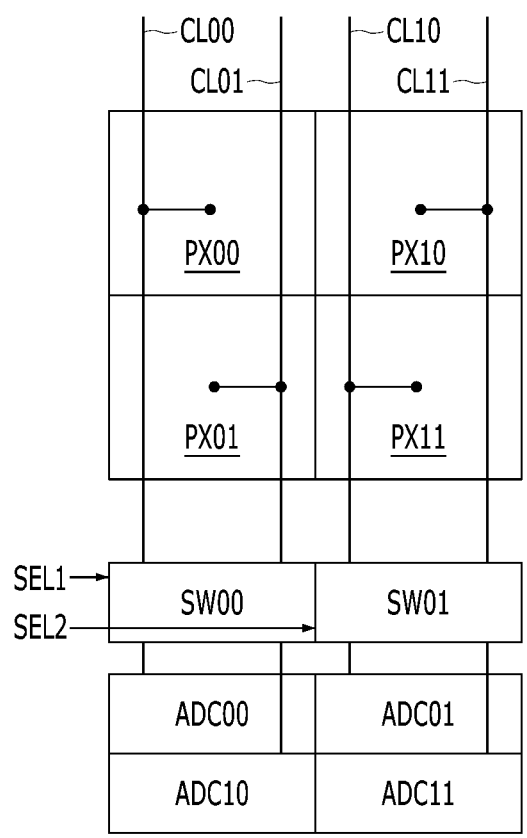
FIG. 2 is a block diagram illustrating internal structures of a pixel array, a path change region, a first readout region and a second readout region illustrated in FIG. 1.

FIG. 2 is a block diagram illustrating a portion of each of the pixel array 120, the first and second readout regions 130 and 140 and the path change region 150 illustrated in FIG. 1.

Referring to FIG. 2, the pixel array 120 may include first to fourth pixel circuits PX00, PX01, PX10 and PX11. The first and second pixel circuits PX00 and PX01 may be arranged in a first column, and the third and fourth pixel circuits PX10 and PX11 may be arranged in a second column. The first and third pixel circuits PX00 and PX10 may be arranged in the first row, and the second and fourth pixel circuits PX01 and PX11 may be arranged in the second row.

Each of the first to fourth pixel circuits PX00, PX01, PX10 and PX11 may include at least one pixel. For example, each of the first to fourth pixel circuits PX00, PX01, PX10 and PX11 may include a single pixel or a plurality of pixels. The plurality of pixels may have a structure of sharing each column line.

The first pixel circuit PX00 may be coupled to a first odd-numbered column line CL00. The second pixel circuit PX01 may be coupled to a first even-numbered column line CL01. The third pixel circuit PX10 may be coupled to a second even-numbered column line CL11. The fourth pixel circuit PX11 may be coupled to a second odd-numbered column line CL10. It may be seen that a coupling structure of the first pixel circuit PX00, the second pixel circuit PX01, the first odd-numbered column line CL00 and the first even-numbered column line CL01 is different from a coupling structure of the third pixel circuit PX10, the fourth pixel circuit PX11, the second odd-numbered column line CL10 and the second even-numbered column line CL11. For example, the coupling structures may be opposite to (or mirror images of) each other.

The first pixel circuit PX00 may output at least one pixel signal to the first odd-numbered column line CL00 during the first row line time. The second pixel circuit PX01 may output at least one pixel signal to the first even-numbered column line CL01 during the first row line time. The third pixel circuit PX10 may output at least one pixel signal to the second even-numbered column line CL11 during the first row line time. The fourth pixel circuit PX11 may output at least one pixel signal to the second odd-numbered column line CL10 during the first row line time.

The first odd-numbered column line CL00, the first even-numbered column line CL01, the second odd-numbered column line CL10 and the second even-numbered column line CL11 may be disposed sequentially in a row direction. Each individual column line may extend in the column direction.

The first readout region 130 may include first and third readout circuits ADC00 and ADC01. The first readout circuit ADC00 may read out the pixel signal generated from the first pixel circuit PX00 or the pixel signal generated from the second pixel circuit PX01. For example, the first readout circuit ADC00 may read out the pixel signal generated from the first pixel circuit PX00 during a first frame time, and read out the pixel signal generated from the second pixel circuit PX01 during a second frame time. The third readout circuit ADC01 may read out the pixel signal generated from the third pixel circuit PX10 or the pixel signal generated from the fourth pixel circuit PX11. For example, the third readout circuit ADC01 may read out the pixel signal generated from the fourth pixel circuit PX11 during the first frame time, and read out the pixel signal generated from the third pixel circuit PX10 during the second frame time.

The second readout region 140 may include second and fourth readout circuits ADC10 and ADC11. The second readout circuit ADC10 may read out the pixel signal generated from the first pixel circuit PX00 or the pixel signal generated from the second pixel circuit PX01. For example, the second readout circuit ADC10 may read out the pixel signal generated from the second pixel circuit PX01 during the first frame time, and read out the pixel signal generated from the first pixel circuit PX00 during the second frame time. The fourth readout circuit ADC11 may read out the pixel signal generated from the third pixel circuit PX10 or the pixel signal generated from the fourth pixel circuit PX11. For example, the fourth readout circuit ADC11 may read out the pixel signal generated from the third pixel circuit PX10 during the first frame time, and read out the pixel signal generated from the fourth pixel circuit PX11 during the second frame time.

The first and second readout circuits ADC00 and ADC10 may correspond to the first and second pixel circuits PX00 and PX01, and read out the pixel signals generated from the first and second pixel circuits PX00 and PX01. The third and fourth readout circuits ADC01 and ADC11 may correspond to the third and fourth pixel circuits PX10 and PX11, and read out the pixel signals generated from the third and fourth pixel circuits PX10 and PX11.

The path change region 150 may include first and second path change circuits SW00 and SW01. The first path change circuit SW00 may change first and second paths between the first odd-numbered column line CL00 and the first even-numbered column line CL01, and the first readout circuit ADC00 and the second readout circuit ADC10, based on a first control signal SEL1. For example, the first path change circuit SW00 may change the first and second paths for each unit time, that is, at or within each of multiple recurring time periods. The second path change circuit SW01 may change third and fourth paths between the second odd-numbered column line CL10 and the second even-numbered column line CL11, and the third readout circuit ADC01 and the fourth readout circuit ADC11, based on a second control signal SEL2. For example, the second path change circuit SW01 may change the third and fourth paths for each unit time.

The first and second control signals SEL1 and SEL2 may be generated from the controller 160. In the present embodiment, the first and second control signals SEL1 and SEL2 may be generated in mutually-inverted states for each unit time. For example, the first and second control signals SEL1 and SEL2 may be the same signal. In some embodiments, any one of the first and second control signals SEL1 and SEL2 may transition for each unit time, and the other one may be randomly generated. In some embodiments, each of the first and second control signals SEL1 and SEL2 may be randomly generated. The unit time may be two or more row line times or one or more frame times.

Figure 3:
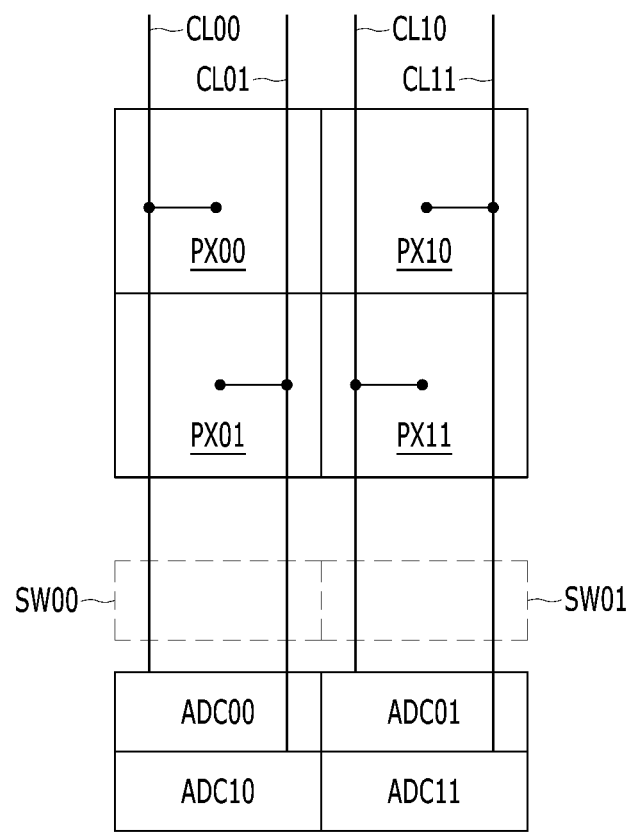
FIGS. 3 and 4 are block diagrams illustrating first and second path change circuits illustrated in FIG. 2.
Figure 4:
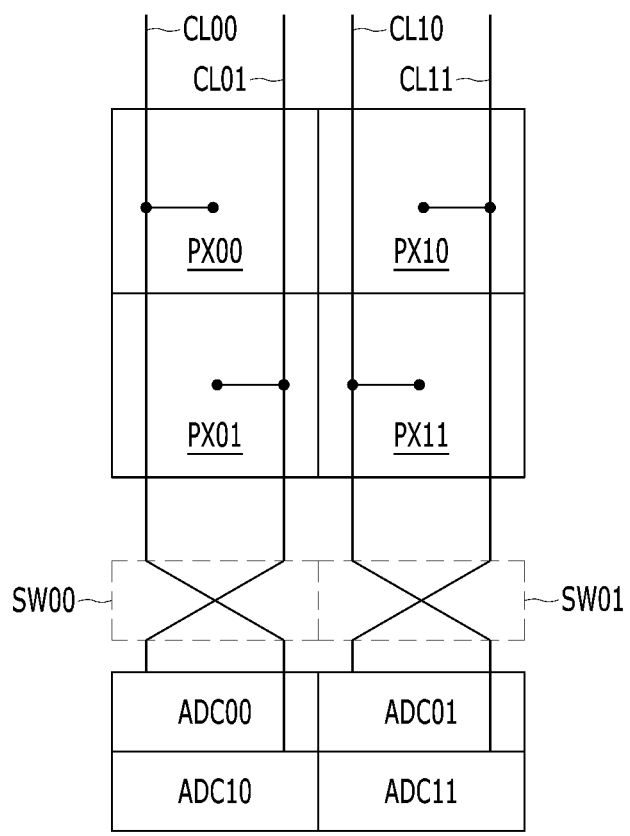

FIGS. 3 and 4 are block diagrams illustrating the first and second path change circuits SW00 and SW01 illustrated in FIG. 2.

For example, FIGS. 3 and 4 are block diagrams illustrating operations of the first and second path change circuits SW00 and SW01 when the first and second control signals SEL1 and SEL2 are in the non-inverted states. FIG. 3 illustrates an example of the first to fourth paths formed through the first and second path change circuits SW00 and SW01 when the first and second control signals SEL1 and SEL2 are each at a first logic level, for example, "0", and FIG. 4 illustrates an example of the first to fourth paths formed through the first and second path change circuits SW00 and SW01 when the first and second control signals SEL1 and SEL2 are each at a second logic level, for example, "1".

As illustrated in FIG. 3, when the first and second control signals SEL1 and SEL2 are each at a logic low level, i.e., "0", the first path change circuit SW00 may change the first and second paths so that the first odd-numbered column line CL00 is coupled to the first readout circuit ADC00 and the first even-numbered column line CL01 is coupled to the second readout circuit ADC10, and the second path change circuit SW01 may change the third and fourth paths so that the second odd-numbered column line CL10 is coupled to the third readout circuit ADC01 and the second even-numbered column line CL11 is coupled to the fourth readout circuit ADC11. For example, the first and second paths may be formed in parallel in the column direction and the third and fourth paths may also be formed in parallel in the column direction.

As illustrated in FIG. 4, when the first and second control signals SEL1 and SEL2 are each at a logic high level, i.e., "1", the first path change circuit SW0 may change the first and second paths so that the first odd-numbered column line CL00 is coupled to the second readout circuit ADC10 and the first even-numbered column line CL01 is coupled to the first readout circuit ADC00, and the second path change circuit SW01 may change the third and fourth paths so that the second odd-numbered column line CL10 is coupled to the fourth readout circuit ADC11 and the second even-numbered column line CL11 is coupled to the third readout circuit ADC01. For example, the first and second paths may be formed to cross each other, and the third and fourth paths may also be formed to cross each other.

Hereinafter, an operation of the image sensing device 100 having the above-described configuration in accordance with the first embodiment is described.

In the present embodiment, it is described as an example that the first and second paths and the third and fourth paths are changed for each single frame time.

First, the operation of the image sensing device 100 during the first frame time is described below.

During the first frame time, the controller 160 may generate the first and second control signals SEL1 and SEL2 each having the logic low level, i.e., "0". The first path change circuit SW0 may change the first and second paths between the column lines, i.e., the first odd-numbered column line CL00 and the first even-numbered column line CL01, and the readout circuits, i.e., the first readout circuit ADC00 and the second readout circuit ADC10, based on the first control signal SEL1, so that the first and second pixel circuits PX00 and PX01 are coupled to the first and second readout circuits ADC00 and ADC10 according to a first relationship (i.e., a first corresponding relationship). For example, the first path change circuit SW0 may change the first and second paths so that the first odd-numbered column line CL00 is coupled to the first readout circuit ADC00 and the first even-numbered column line CL01 is coupled to the second readout circuit ADC10 (refer to FIG. 3). The second path change circuit SW01 may change, based on the second control signal SEL2, the third and fourth paths between the column lines (i.e., the second odd-numbered column line CL10 and the second even-numbered column line CL11) and the readout circuits (i.e., the third readout circuit ADC01 and the fourth readout circuit ADC11) so that the third and fourth pixel circuits PX10 and PX11 are coupled to the third and fourth readout circuits ADC01 and ADC11 according to a second relationship (i.e., a second corresponding relationship) different from the first relationship. For example, the second path change circuit SW01 may change the third and fourth paths so that the second odd-numbered column line CL10 is coupled to the third readout circuit ADC01 and the second even-numbered column line CL11 is coupled to the fourth readout circuit ADC11 (refer to FIG. 3).

During the first row line time of the first frame time, the first pixel circuit PX00 may output at least one pixel signal through the first odd-numbered column line CL00, the second pixel circuit PX01 may output at least one pixel signal through the first even-numbered column line CL01, the third pixel circuit PX10 may output at least one pixel signal through the second even-numbered column line CL11, and the fourth pixel circuit PX11 may output at least one pixel signal through the second odd-numbered column line CL10.

Accordingly, the first readout circuit ADC00 may read out the pixel signal of the first pixel circuit PX00, the second readout circuit ADC10 may read out the pixel signal of the second pixel circuit PX01, the third readout circuit ADC01 may read out the pixel signal of the fourth pixel circuit PX11, and the fourth readout circuit ADC11 may read out the pixel signal of the third pixel circuit PX10.

The operation of the image sensing device 100 during the first frame time is described below with reference to FIG. 5.

Figure 5:
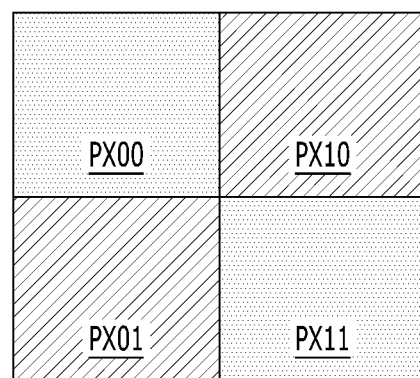
FIGS. 5 and 6 are diagrams for describing through which readout regions pixel signals of first to fourth pixel circuits illustrated in FIG. 2 are read out.

FIG. 5 is a diagram for describing through which readout region the pixel signals generated from the first to fourth pixel circuits PX00, PX01, PX10 and PX11 illustrated in FIG. 2 are read out between the first and second readout regions 130 and 140.

Referring to FIG. 5, during the first row line time of the first frame time, half of the pixel signals generated from the first and third pixel circuits PX00 and PX10 arranged in the first row may be read out through the first readout circuit ADC00 included in the first readout region 130, and the other half of the pixel signals may be read out through the fourth readout circuit ADC11 included in the second readout region 140. Similarly, during the first row line time of the first frame time, half of the pixel signals generated from the second and fourth pixel circuits PX01 and PX11 arranged in the second row may be read out through the second readout circuit ADC10 included in the second readout region 140, and the other half of the pixel signals may be read out through the third readout circuit ADC01 included in the first readout region 130.

Accordingly, the pixel signals may be read out in a form in which some readout circuits included in the first readout region 130 and some readout circuits included in the second readout region 140 are mixed based on the same row line.

Next, the operation of the image sensing device 100 during the second frame time is described below.

During the second frame time, the controller 160 may generate the first and second control signals SEL1 and SEL2 each having the logic high level, i.e., "1". The first path change circuit SW0 may change, based on the first control signal SEL1, the first and second paths between the column lines (i.e., the first odd-numbered column line CL00 and the first even-numbered column line CL01) and the readout circuits (i.e., the first readout circuit ADC00 and the second readout circuit ADC10) so that the first and second pixel circuits PX00 and PX01 are coupled to the first and second readout circuits ADC00 and ADC10 according to the second relationship. For example, the first path change circuit SW0 may change the first and second paths so that the first odd-numbered column line CL00 is coupled to the second readout circuit ADC10 and the first even-numbered column line CL01 is coupled to the first readout circuit ADC00 (refer to FIG. 4). The second path change circuit SW01 may change, based on the second control signal SEL2, the third and fourth paths between the column lines (i.e., the second odd-numbered column line CL10 and the second even-numbered column line CL11) and the readout circuits (i.e., the third readout circuit ADC01 and the fourth readout circuit ADC11) so that the third and fourth pixel circuits PX10 and PX11 are coupled to the third and fourth readout circuits ADC01 and ADC11 according to the first relationship. For example, the second path change circuit SW01 may change the third and fourth paths so that the second odd-numbered column line CL10 is coupled to the fourth readout circuit ADC11 and the second even-numbered column line CL11 is coupled to the third readout circuit ADC01 (refer to FIG. 4).

During the first row line time of the second frame time, the first pixel circuit PX00 may output at least one pixel signal through the first odd-numbered column line CL00, the second pixel circuit PX01 may output at least one pixel signal through the first even-numbered column line CL01, the third pixel circuit PX10 may output at least one pixel signal through the second even-numbered column line CL11, and the fourth pixel circuit PX11 may output at least one pixel signal through the second odd-numbered column line CL10.

Accordingly, the first readout circuit ADC00 may read out the pixel signal of the second pixel circuit PX01, the second readout circuit ADC10 may read out the pixel signal of the first pixel circuit PX00, the third readout circuit ADC01 may read out the pixel signal of the third pixel circuit PX10, and the fourth readout circuit ADC11 may read out the pixel signal of the fourth pixel circuit PX11.

The operation of the image sensing device 100 during the second frame time is described below with reference to FIG. 6.

Figure 6:
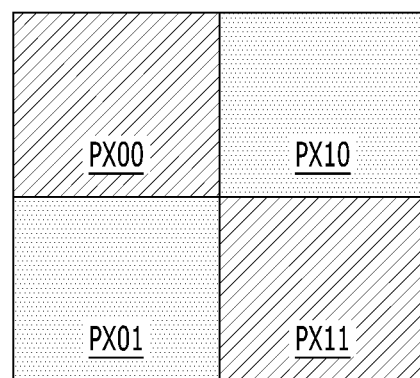

FIG. 6 is a diagram for describing through which readout region the pixel signals generated from the first to fourth pixel circuits PX00, PX01, PX10 and PX11 illustrated in FIG. 2 are read out between the first and second readout regions 130 and 140.

Referring to FIG. 6, during the first row line time of the second frame time, half of the pixel signals generated from the first and third pixel circuits PX00 and PX10 arranged in the first row may be read out through the second readout circuit ADC10 included in the second readout region 140, and the other half of the pixel signals may be read out through the third readout circuit ADC01 included in the first readout region 130. Similarly, during the first row line time of the second frame time, half of the pixel signals generated from the second and fourth pixel circuits PX01 and PX11 arranged in the second row may be read out through the first readout circuit ADC00 included in the first readout region 130, and the other half of the pixel signals may be read out through the fourth readout circuit ADC11 included in the second readout region 140.

Accordingly, the pixel signals may be read out from the pixel circuits arranged in each row, in a form in which some readout circuits included in the first readout region 130 and some readout circuits included in the second readout region 140 are mixed.

In addition, the respective readout circuits included in the first readout region 130 and the respective readout circuits included in the second readout region 140 may alternately read out the pixel signals from corresponding two pixel circuits during the first and second frame times.

Although it is described as an example in the first embodiment that the first to fourth paths are changed for each single frame time, the present disclosure is not limited thereto. For example, in the first embodiment, the first to fourth paths may be changed every two or more row line times or two or more frame times. In addition, although it is described as an example in the first embodiment that the first to fourth paths are continuously, that is, regularly, changed during the first and second frame times, the present disclosure is not limited thereto. For example, in the first embodiment, the first to fourth paths may be randomly changed during the first and second frame times.

Figure 7:
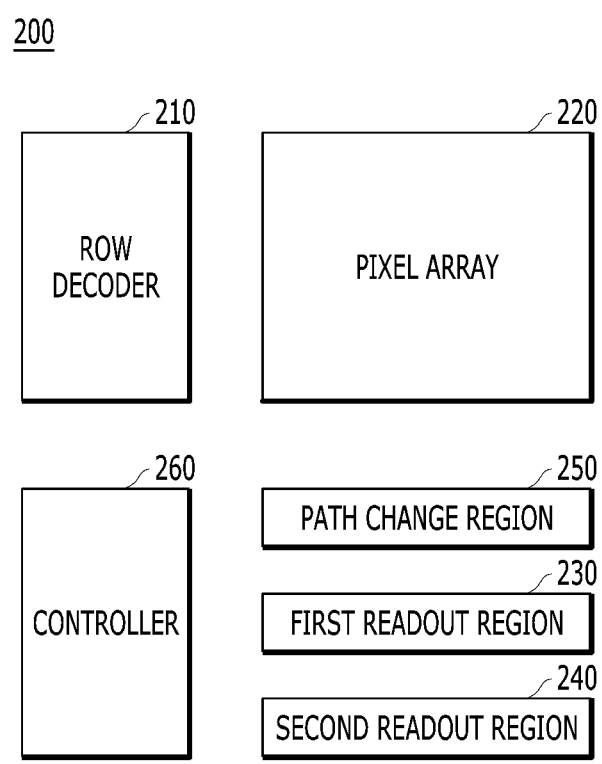
FIG. 7 is a block diagram illustrating an image sensing device in accordance with a second embodiment of the present disclosure.

FIG. 7 is a block diagram illustrating an image sensing device 200 in accordance with a second embodiment of the present disclosure.

Referring to FIG. 7, the image sensing device 200 may include a row decoder 210, a pixel array 220, a first readout region 230, a second readout region 240, a path change region 250 and a controller 260.

The row decoder 210 may control an operation of the pixel array 220. For example, the row decoder 210 may control the pixel array 220 in units of two rows.

The pixel array 220 may include a plurality of pixel circuits arranged at intersections of a plurality of rows and a plurality of columns. The plurality of pixel circuits are described below, particularly with reference to FIG. 8. The pixel array 220 may generate pixel signals under the control of the row decoder 210. For example, the pixel array 220 may generate the pixel signals from the pixel circuits arranged in first and second rows during a first row line time, and generate the pixel signals from the pixel circuits arranged in $(2n-1)^{th}$ and $2n^{th}$ rows during an $n^{th}$ row line time (where "n" is a natural number).

The first readout region 230 may read out half of the pixel signals generated from the pixel array 220. For example, the first readout region 230 may read out the pixel signals generated from half of the pixel circuits arranged in the first row and the pixel signals generated from half of the pixel circuits arranged in the second row, during the first row line time.

The second readout region 240 may read out the other half of the pixel signals generated from the pixel array 220. For example, the second readout region 240 may read out the pixel signals generated from the other half of the pixel circuits arranged in the first row and the pixel signals generated from the other half of the pixel circuits arranged in the second row, during the first row line time.

The path change region 250 may transfer the half of the pixel signals, generated from the pixel array 220, to the first readout region 230, and transfer the other half of the pixel signals, generated from the pixel array 220, to the second readout region 240.

The first readout region 230, the second readout region 240 and the path change region 250 may be disposed on one side of the pixel array 220. Particularly, the path change region 250 may be disposed between the pixel array 220 and the readout regions 230 and 240.

The controller 260 may control overall operations of the row decoder 210, the first and second readout regions 230 and 240 and the path change region 250. For example, the controller 260 may include a timing controller.

Figure 8:
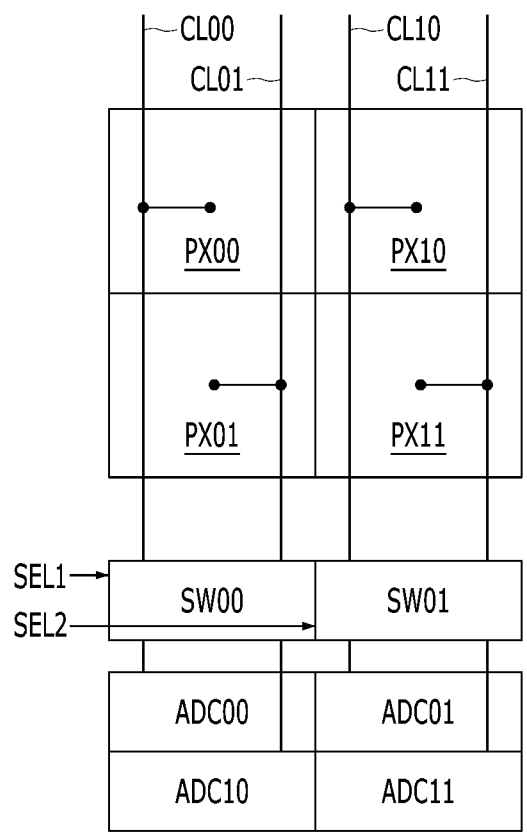
FIG. 8 is a block diagram illustrating internal structures of a pixel array, a path change region, a first readout region and a second readout region illustrated in FIG. 7.

FIG. 8 is a block diagram illustrating a portion of each of the pixel array 220, the first and second readout regions 230 and 240 and the path change region 250 illustrated in FIG. 7.

Referring to FIG. 8, the pixel array 220 may include first to fourth pixel circuits PX00, PX01, PX10 and PX11. The first and second pixel circuits PX00 and PX01 may be arranged in a first column, and the third and fourth pixel circuits PX10 and PX11 may be arranged in a second column. The first and third pixel circuits PX00 and PX10 may be arranged in the first row, and the second and fourth pixel circuits PX01 and PX11 may be arranged in the second row.

Each of the first to fourth pixel circuits PX00, PX01, PX10 and PX11 may include at least one pixel. For example, each of the first to fourth pixel circuits PX00, PX01, PX10 and PX11 may include a single pixel or a plurality of pixels. The plurality of pixels may have a structure of sharing each column line.

The first pixel circuit PX00 may be coupled to a first odd-numbered column line CL00. The second pixel circuit PX01 may be coupled to a first even-numbered column line CL01. The third pixel circuit PX10 may be coupled to a second odd-numbered column line CL10. The fourth pixel circuit PX11 may be coupled to a second even-numbered column line CL11. It may be seen that a coupling structure of the first pixel circuit PX00, the second pixel circuit PX01, the first odd-numbered column line CL00 and the first even-numbered column line CL01 is the same as a coupling structure of the third pixel circuit PX10, the fourth pixel circuit PX11, the second odd-numbered column line CL10 and the second even-numbered column line CL11.

The first pixel circuit PX00 may output at least one pixel signal to the first odd-numbered column line CL00 during the first row line time. The second pixel circuit PX01 may output at least one pixel signal to the first even-numbered column line CL01 during the first row line time. The third pixel circuit PX10 may output at least one pixel signal to the second odd-numbered column line CL10 during the first row line time. The fourth pixel circuit PX11 may output at least one pixel signal to the second even-numbered column line CL11 during the first row line time.

Each of the first odd-numbered column line CL00, the first even-numbered column line CL01, the second odd-numbered column line CL10 and the second even-numbered column line CL11 may be extended in a column direction, while the column lines are disposed sequentially in a row direction.

The first readout region 230 may include first and third readout circuits ADC00 and ADC01. The first readout circuit ADC00 may read out the pixel signal generated from the first pixel circuit PX00 or the pixel signal generated from the second pixel circuit PX01. For example, the first readout circuit ADC00 may read out the pixel signal generated from the first pixel circuit PX00 during a first frame time, and read out the pixel signal generated from the second pixel circuit PX01 during a second frame time. The third readout circuit ADC01 may read out the pixel signal generated from the third pixel circuit PX10 or the pixel signal generated from the fourth pixel circuit PX11. For example, the third readout circuit ADC01 may read out the pixel signal generated from the fourth pixel circuit PX11 during the first frame time, and read out the pixel signal generated from the third pixel circuit PX10 during the second frame time.

The second readout region 240 may include second and fourth readout circuits ADC10 and ADC11. The second readout circuit ADC10 may read out the pixel signal generated from the first pixel circuit PX00 or the pixel signal generated from the second pixel circuit PX01. For example, the second readout circuit ADC10 may read out the pixel signal generated from the second pixel circuit PX01 during the first frame time, and read out the pixel signal generated from the first pixel circuit PX00 during the second frame time. The fourth readout circuit ADC11 may read out the pixel signal generated from the third pixel circuit PX10 or the pixel signal generated from the fourth pixel circuit PX11. For example, the fourth readout circuit ADC11 may read out the pixel signal generated from the third pixel circuit PX10 during the first frame time, and read out the pixel signal generated from the fourth pixel circuit PX11 during the second frame time.

The first and second readout circuits ADC00 and ADC10 may correspond to the first and second pixel circuits PX00 and PX01, and read out the pixel signals generated from the first and second pixel circuits PX00 and PX01. The third and fourth readout circuits ADC01 and ADC11 may correspond to the third and fourth pixel circuits PX10 and PX11, and read out the pixel signals generated from the third and fourth pixel circuits PX10 and PX11.

The path change region 250 may include first and second path change circuits SW00 and SW01. The first path change circuit SW00 may change first and second paths between the first odd-numbered column line CL00 and the first even-numbered column line CL01, and the first readout circuit ADC00 and the second readout circuit ADC10, based on a first control signal SEL1. The first path change circuit SW00 may change the first and second paths for each unit time. The second path change circuit SW01 may change third and fourth paths between the second odd-numbered column line CL10 and the second even-numbered column line CL11, and the third readout circuit ADC01 and the fourth readout circuit ADC11, based on a second control signal SEL2. The second path change circuit SW01 may change the third and fourth paths for each unit time.

The first and second control signals SEL1 and SEL2 may be generated from the controller 160. In the present embodiment, the first and second control signals SEL1 and SEL2 may be generated in mutually-inverted states for each unit time. In some embodiments, any one of the first and second control signals SEL1 and SEL2 may transition for each unit time, and the other one may be randomly generated. In some embodiments, each of the first and second control signals SEL1 and SEL2 may be randomly generated. The unit time may include any one of two or more row line times and one or more frame times.

Figure 9:
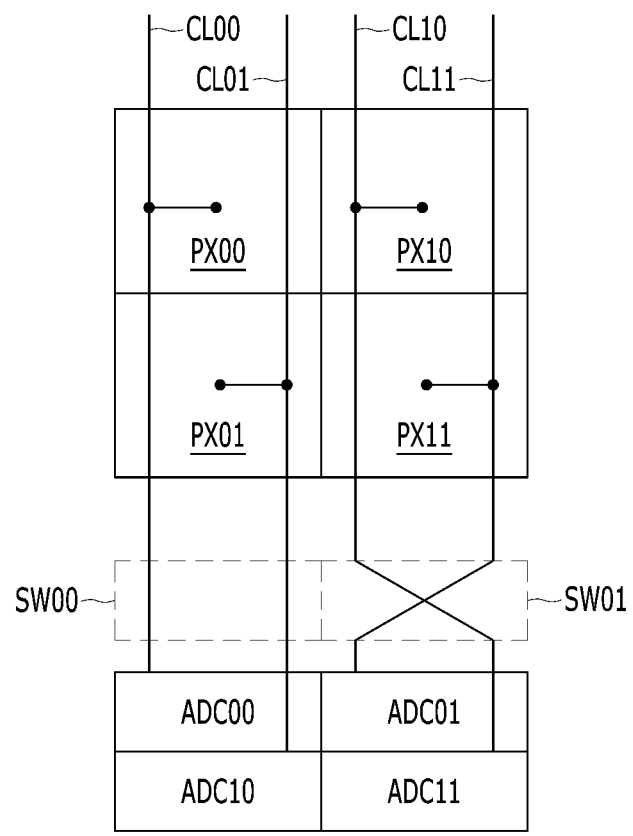
FIGS. 9 and 10 are block diagrams illustrating first and second path change circuits illustrated in FIG. 8.
Figure 10:
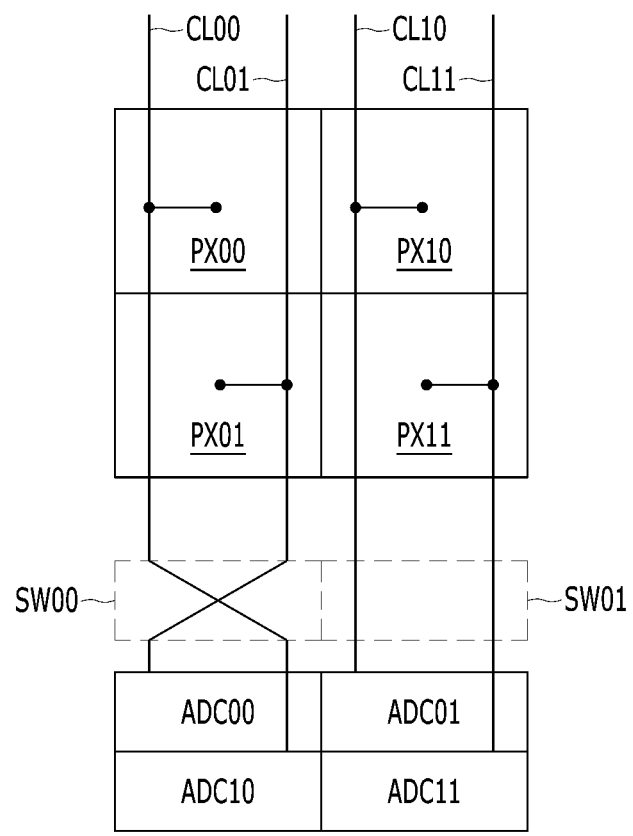

FIGS. 9 and 10 are block diagrams illustrating the first and second path change circuits SW00 and SW01 illustrated in FIG. 8.

For example, FIGS. 9 and 10 illustrate operations of the first and second path change circuits SW00 and SW01 when the first and second control signals SEL1 and SEL2 are in the non-inverted states. FIG. 9 illustrates an example of the first to fourth paths formed through the first and second path change circuits SW00 and SW01 when the first control signal SEL1 is at a first logic level, for example, "0", and the second control signal SEL2 is at a second logic level, for example, "1", and FIG. 10 illustrates an example of the first to fourth paths formed through the first and second path change circuits SW00 and SW01 when the first control signal SEL1 is at the second logic level, for example, "1", and the second control signal SEL2 is at the first logic level, for example, "0".

As illustrated in FIG. 9, when the first control signal SEL1 is at a logic low level, i.e., "0", and the second control signal SEL2 is at a logic high level, i.e., "1", the first path change circuit SW00 may change the first and second paths so that the first odd-numbered column line CL00 is coupled to the first readout circuit ADC00 and the first even-numbered column line CL01 is coupled to the second readout circuit ADC10, and the second path change circuit SW01 may change the third and fourth paths so that the second odd-numbered column line CL10 is coupled to the fourth readout circuit ADC11 and the second even-numbered column line CL11 is coupled to the third readout circuit ADC01. For example, the first and second paths may be formed in parallel in the column direction and the third and fourth paths may be formed to cross each other.

As illustrated in FIG. 10, when the first control signal SEL1 is at the logic high level, i.e., "1", and the second control signal SEL2 is at the logic low level, i.e., "0", the first path change circuit SW0 may change the first and second paths so that the first odd-numbered column line CL00 is coupled to the second readout circuit ADC10 and the first even-numbered column line CL01 is coupled to the first readout circuit ADC00, and the second path change circuit SW01 may change the third and fourth paths so that the second odd-numbered column line CL10 is coupled to the third readout circuit ADC01 and the second even-numbered column line CL11 is coupled to the fourth readout circuit ADC11. For example, the first and second paths may be formed to cross each other and the third and fourth paths may be formed in parallel in the column direction.

Hereinafter, an operation of the image sensing device 200 having the above-described configuration in accordance with the second embodiment is described.

In the present embodiment, it is described as an example that the first and second paths and the third and fourth paths are changed for each single frame time.

First, the operation of the image sensing device 200 during the first frame time is described below.

During the first frame time, the controller 260 may generate the first control signal SEL1 having the logic low level, i.e., "0", and the second control signal SEL2 having the logic high level, i.e., "1". The first path change circuit SW00 may change, based on the first control signal SEL1, the first and second paths between the column lines (i.e., the first odd-numbered column line CL00 and the first even-numbered column line CL01) and the readout circuits (i.e., the first readout circuit ADC00 and the second readout circuit ADC10) so that the first and second pixel circuits PX00 and PX01 are coupled to the first and second readout circuits ADC00 and ADC10 according to a first relationship. For example, the first path change circuit SW00 may change the first and second paths so that the first odd-numbered column line CL00 is coupled to the first readout circuit ADC00 and the first even-numbered column line CL01 is coupled to the second readout circuit ADC10 (refer to FIG. 9). The second path change circuit SW01 may change, based on the second control signal SEL2, the third and fourth paths between the column lines (i.e., the second odd-numbered column line CL10 and the second even-numbered column line CL11) and the readout circuits (i.e., the third readout circuit ADC01 and the fourth readout circuit ADC11) so that the third and fourth pixel circuits PX10 and PX11 are coupled to the third and fourth readout circuits ADC01 and ADC11 according to a second relationship different from the first relationship. For example, the second path change circuit SW01 may change the third and fourth paths so that the second odd-numbered column line CL10 is coupled to the fourth readout circuit ADC11 and the second even-numbered column line CL11 is coupled to the third readout circuit ADC01 (refer to FIG. 9).

During the first row line time of the first frame time, the first pixel circuit PX00 may output at least one pixel signal through the first odd-numbered column line CL00, the second pixel circuit PX01 may output at least one pixel signal through the first even-numbered column line CL01, the third pixel circuit PX10 may output at least one pixel signal through the second odd-numbered column line CL10, and the fourth pixel circuit PX11 may output at least one pixel signal through the second even-numbered column line CL11.

Accordingly, the first readout circuit ADC00 may read out the pixel signal of the first pixel circuit PX00, the second readout circuit ADC10 may read out the pixel signal of the second pixel circuit PX01, the third readout circuit ADC01 may read out the pixel signal of the fourth pixel circuit PX11, and the fourth readout circuit ADC11 may read out the pixel signal of the third pixel circuit PX10.

The operation of the image sensing device 200 during the first frame time is described below with reference to FIG. 11.

Figure 11:
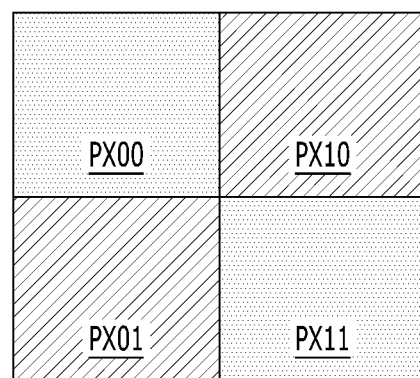
FIGS. 11 and 12 are diagrams for describing through which readout regions pixel signals of first to fourth pixel circuits illustrated in FIG. 8 are read out.

FIG. 11 is a diagram for describing through which readout regions the pixel signals generated from the first to fourth pixel circuits PX00, PX01, PX10 and PX11 illustrated in FIG. 8 are read out between the first and second readout regions 230 and 240.

Referring to FIG. 11, during the first row line time of the first frame time, half of the pixel signals generated from the first and third pixel circuits PX00 and PX10 arranged in the first row may be read out through the first readout circuit ADC00 included in the first readout region 230, and the other half of the pixel signals may be read out through the fourth readout circuit ADC11 included in the second readout region 240. Similarly, during the first row line time of the first frame time, half of the pixel signals generated from the second and fourth pixel circuits PX01 and PX11 arranged in the second row may be read out through the second readout circuit ADC10 included in the second readout region 240, and the other half of the pixel signals may be read out through the third readout circuit ADC01 included in the first readout region 230.

Accordingly, the pixel signals may be read out in a form in which some readout circuits included in the first readout region 230 and some readout circuits included in the second readout region 240 are mixed based on the same row line.

Next, the operation of the image sensing device 200 during the second frame time is described below.

During the second frame time, the controller 260 may generate the first control signal SEL1 having the logic high level, i.e., "1", and the second control signal SEL2 having the logic low level, i.e., "0". The first path change circuit SW00 may change, based on the first control signal SEL1, the first and second paths between the column lines (i.e., the first odd-numbered column line CL00 and the first even-numbered column line CL01) and the readout circuits (i.e., the first readout circuit ADC00 and the second readout circuit ADC10) so that the first and second pixel circuits PX00 and PX01 are coupled to the first and second readout circuits ADC00 and ADC10 according to the second relationship. For example, the first path change circuit SW00 may change the first and second paths so that the first odd-numbered column line CL00 is coupled to the second readout circuit ADC10 and the first even-numbered column line CL01 is coupled to the first readout circuit ADC00 (refer to FIG. 10). The second path change circuit SW01 may change, based on the second control signal SEL2, the third and fourth paths between the column lines (i.e., the second odd-numbered column line CL10 and the second even-numbered column line CL11) and the readout circuits (i.e., the third readout circuit ADC01 and the fourth readout circuit ADC11) so that the third and fourth pixel circuits PX10 and PX11 are coupled to the third and fourth readout circuits ADC01 and ADC11 according to the first relationship. For example, the second path change circuit SW01 may change the third and fourth paths so that the second odd-numbered column line CL10 is coupled to the third readout circuit ADC01 and the second even-numbered column line CL11 is coupled to the fourth readout circuit ADC11 (refer to FIG. 10).

During the first row line time of the second frame time, the first pixel circuit PX00 may output at least one pixel signal through the first odd-numbered column line CL00, the second pixel circuit PX01 may output at least one pixel signal through the first even-numbered column line CL01, the third pixel circuit PX10 may output at least one pixel signal through the second odd-numbered column line CL10, and the fourth pixel circuit PX11 may output at least one pixel signal through the second even-numbered column line CL11.

Accordingly, the first readout circuit ADC00 may read out the pixel signal of the second pixel circuit PX01, the second readout circuit ADC10 may read out the pixel signal of the first pixel circuit PX00, the third readout circuit ADC01 may read out the pixel signal of the third pixel circuit PX10, and the fourth readout circuit ADC11 may read out the pixel signal of the fourth pixel circuit PX11.

The operation of the image sensing device 200 during the second frame time is described below with reference to FIG. 12.

Figure 12:
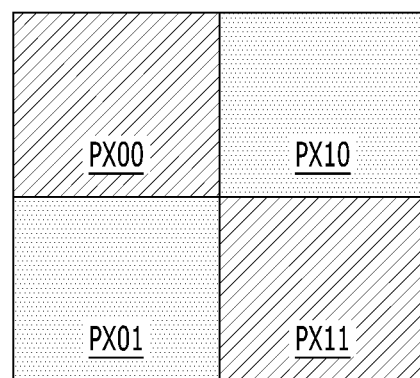

FIG. 12 is a diagram for describing through which readout regions the pixel signals generated from the first to fourth pixel circuits PX00, PX01, PX10 and PX11 illustrated in FIG. 8 are read out between the first and second readout regions 230 and 240.

Referring to FIG. 12, during the first row line time of the second frame time, half of the pixel signals generated from the first and third pixel circuits PX00 and PX10 arranged in the first row may be read out through the second readout circuit ADC10 included in the second readout region 240, and the other half of the pixel signals may be read out through the third readout circuit ADC01 included in the first readout region 230. Similarly, during the first row line time of the second frame time, half of the pixel signals generated from the second and fourth pixel circuits PX01 and PX11 arranged in the second row may be read out through the first readout circuit ADC00 included in the first readout region 230, and the other half of the pixel signals may be read out through the fourth readout circuit ADC11 included in the second readout region 240.

Accordingly, the pixel signals may be read out from the pixel circuits arranged in each row, in a form in which some readout circuits included in the first readout region 230 and some readout circuits included in the second readout region 240 are mixed.

In addition, the respective readout circuits included in the first readout region 230 and the respective readout circuits included in the second readout region 240 may alternately read out the pixel signals from corresponding two pixel circuits during the first and second frame times.

Although it is described as an example in the second embodiment that the first to fourth paths are changed for each single frame time, the present disclosure is not limited thereto. For example, in the second embodiment, the first to fourth paths may be changed every two or more row line times or two or more frame times. In addition, although it is described as an example in the second embodiment that the first to fourth paths are continuously that is, regularly, changed during the first and second frame times, the present disclosure is not limited thereto. For example, in the second embodiment, the first to fourth paths may be randomly changed during the first and second frame times.

Figure 13:
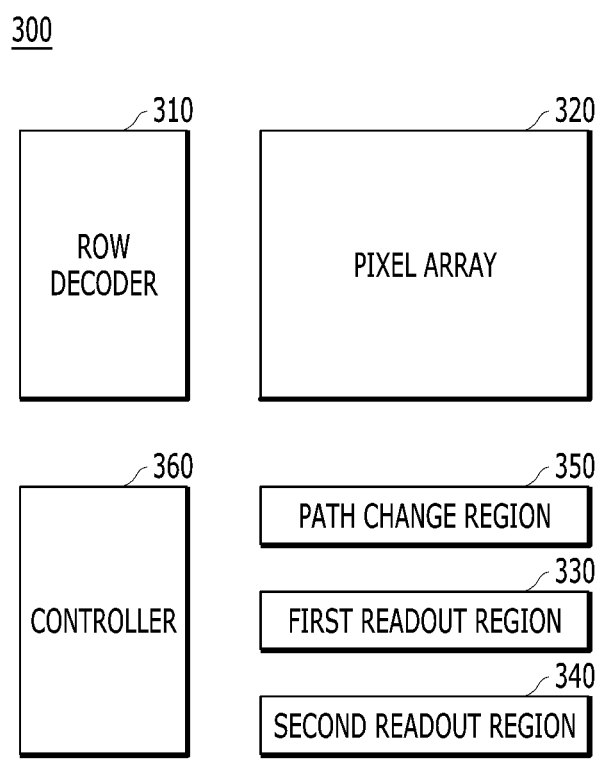
FIG. 13 is a block diagram illustrating an image sensing device in accordance with a third embodiment of the present disclosure.

FIG. 13 is a block diagram illustrating an image sensing device 300 in accordance with a third embodiment of the present disclosure.

Referring to FIG. 13, the image sensing device 300 may include a row decoder 310, a pixel array 320, a first readout region 330, a second readout region 340, a path change region 350 and a controller 360.

The row decoder 310 may control an operation of the pixel array 320. For example, the row decoder 310 may control the pixel array 320 in units of two rows.

The pixel array 320 may include a plurality of pixel circuits arranged at intersections of a plurality of rows and a plurality of columns. The plurality of pixel circuits are described below, particularly with reference to FIG. 14. The pixel array 320 may generate pixel signals under the control of the row decoder 310. For example, the pixel array 320 may generate the pixel signals from the pixel circuits arranged in first and second rows during a first row line time, and generate the pixel signals from the pixel circuits arranged in $(2n-1)^{th}$ and $2n^{th}$ rows during an $n^{th}$ row line time (where "n" is a natural number).

The first readout region 330 may read out half of the pixel signals generated from the pixel array 320. For example, the first readout region 330 may read out the pixel signals generated from half of the pixel circuits arranged in the first row and the pixel signals generated from half of the pixel circuits arranged in the second row, during the first row line time.

The second readout region 340 may read out the other half of the pixel signals generated from the pixel array 320. For example, the second readout region 340 may read out the pixel signals generated from the other half of the pixel circuits arranged in the first row and the pixel signals generated from the other half of the pixel circuits arranged in the second row, during the first row line time.

The path change region 350 may transfer the half of the pixel signals, generated from the pixel array 320, to the first readout region 330, and transfer the other half of the pixel signals, generated from the pixel array 320, to the second readout region 340.

The first readout region 330, the second readout region 340 and the path change region 350 may be disposed on one side of the pixel array 320. Particularly, the path change region 350 may be disposed between the pixel array 320 and the readout regions 330 and 340.

The controller 360 may control overall operations of the row decoder 310, the first and second readout regions 330 and 340 and the path change region 350. For example, the controller 360 may include a timing controller.

Figure 14:
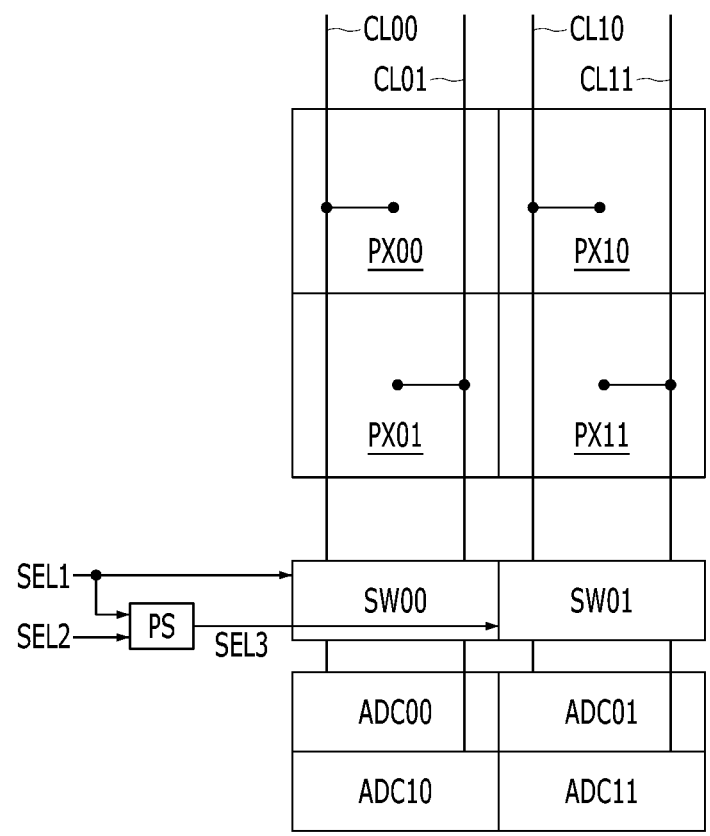
FIG. 14 is a block diagram illustrating internal structures of a pixel array, a first readout region, a second readout region and a path change region illustrated in FIG. 13.

FIG. 14 is a block diagram illustrating a portion of each of the pixel array 320, the first and second readout regions 330 and 340 and the path change region 350 illustrated in FIG. 13.

Referring to FIG. 14, the pixel array 320 may include first to fourth pixel circuits PX00, PX01, PX10 and PX11. The first and second pixel circuits PX00 and PX01 may be arranged in a first column, and the third and fourth pixel circuits PX10 and PX11 may be arranged in a second column. The first and third pixel circuits PX00 and PX10 may be arranged in the first row, and the second and fourth pixel circuits PX01 and PX11 may be arranged in the second row.

Each of the first to fourth pixel circuits PX00, PX01, PX10 and PX11 may include at least one pixel. For example, each of the first to fourth pixel circuits PX00, PX01, PX10 and PX11 may include a single pixel or a plurality of pixels. The plurality of pixels may have a structure of sharing each column line.

The first pixel circuit PX00 may be coupled to a first odd-numbered column line CL00. The second pixel circuit PX01 may be coupled to a first even-numbered column line CL01. The third pixel circuit PX10 may be coupled to a second odd-numbered column line CL10. The fourth pixel circuit PX11 may be coupled to a second even-numbered column line CL11. It may be seen that a coupling structure of the first pixel circuit PX00, the second pixel circuit PX01, the first odd-numbered column line CL00 and the first even-numbered column line CL01 is the same as a coupling structure of the third pixel circuit PX10, the fourth pixel circuit PX11, the second odd-numbered column line CL10 and the second even-numbered column line CL11.

The first pixel circuit PX00 may output at least one pixel signal to the first odd-numbered column line CL00 during the first row line time. The second pixel circuit PX01 may output at least one pixel signal to the first even-numbered column line CL01 during the first row line time. The third pixel circuit PX10 may output at least one pixel signal to the second odd-numbered column line CL10 during the first row line time. The fourth pixel circuit PX11 may output at least one pixel signal to the second even-numbered column line CL11 during the first row line time.

The first odd-numbered column line CL00, the first even-numbered column line CL01, the second odd-numbered column line CL10 and the second even-numbered column line CL11 may be extended in a column direction, and disposed sequentially in a row direction.

The first readout region 330 may include first and third readout circuits ADC00 and ADC01. The first readout circuit ADC00 may read out the pixel signal generated from the first pixel circuit PX00 or the pixel signal generated from the second pixel circuit PX01. For example, the first readout circuit ADC00 may read out the pixel signal generated from the first pixel circuit PX00 during a first frame time, and read out the pixel signal generated from the second pixel circuit PX01 during a second frame time. The third readout circuit ADC01 may read out the pixel signal generated from the third pixel circuit PX10 or the pixel signal generated from the fourth pixel circuit PX11. For example, the third readout circuit ADC01 may read out the pixel signal generated from the fourth pixel circuit PX11 during the first frame time, and read out the pixel signal generated from the third pixel circuit PX10 during the second frame time.

The second readout region 340 may include second and fourth readout circuits ADC10 and ADC11. The second readout circuit ADC10 may read out the pixel signal generated from the first pixel circuit PX00 or the pixel signal generated from the second pixel circuit PX01. For example, the second readout circuit ADC10 may read out the pixel signal generated from the second pixel circuit PX01 during the first frame time, and read out the pixel signal generated from the first pixel circuit PX00 during the second frame time. The fourth readout circuit ADC11 may read out the pixel signal generated from the third pixel circuit PX10 or the pixel signal generated from the fourth pixel circuit PX11. For example, the fourth readout circuit ADC11 may read out the pixel signal generated from the third pixel circuit PX10 during the first frame time, and read out the pixel signal generated from the fourth pixel circuit PX11 during the second frame time.

The first and second readout circuits ADC00 and ADC10 may correspond to the first and second pixel circuits PX00 and PX01, and read out the pixel signals generated from the first and second pixel circuits PX00 and PX01. The third and fourth readout circuits ADC01 and ADC11 may correspond to the third and fourth pixel circuits PX10 and PX11, and read out the pixel signals generated from the third and fourth pixel circuits PX10 and PX11.

The path change region 350 may include a path control circuit PS and first and second path change circuits SW00 and SW01. The path control circuit PS may generate a third control signal SEL3 based on first and second control signals SEL1 and SEL2. The first path change circuit SW00 may change first and second paths between the first odd-numbered column line CL00 and the first even-numbered column line CL01, and the first readout circuit ADC00 and the second readout circuit ADC10, based on the first control signal SEL1. The first path change circuit SW00 may change the first and second paths for each unit time. The second path change circuit SW01 may change third and fourth paths between the second odd-numbered column line CL10 and the second even-numbered column line CL11, and the third readout circuit ADC01 and the fourth readout circuit ADC11, based on the second control signal SEL2. The second path change circuit SW01 may change the third and fourth paths for each unit time.

The first and second control signals SEL1 and SEL2 may be generated from the controller 360. In the present embodiment, the first and second control signals SEL1 and SEL2 may be generated in mutually-inverted states for each unit time. In some embodiments, any one of the first and second control signals SEL1 and SEL2 may transition, that is, be regularly generated, for each unit time, and the other one may be randomly generated. In some embodiments, each of the first and second control signals SEL1 and SEL2 may be randomly generated. The unit time may include any one of two or more row line times and one or more frame times.

Figure 15:
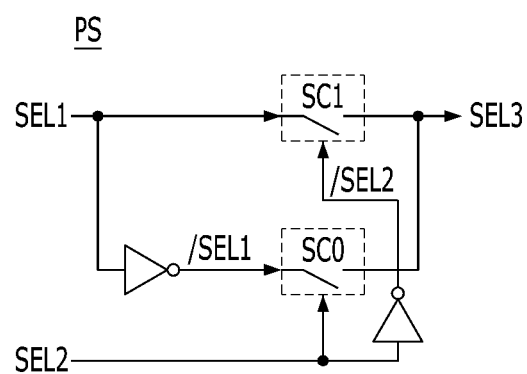
FIG. 15 is a circuit diagram illustrating a path control circuit illustrated in FIG. 14.

FIG. 15 is a circuit diagram illustrating the path control circuit PS illustrated in FIG. 14.

Referring to FIG. 15, the path control circuit PS may include a first switching element SC0 and a second switching element SC1.

The first switching element SC0 may output a first inverted control signal /SEL1 as the third control signal SEL3 based on the second control signal SEL2. The first inverted control signal /SEL1 may be a signal obtained by inverting the first control signal SEL.

The second switching element SC1 may output the first control signal SEL1 as the third control signal SEL3 based on a second inverted control signal /SEL2. The second inverted control signal /SEL2 may be a signal obtained by inverting the second control signal SEL2.

FIGS. 16 to 19 are block diagrams for describing the first and second path change circuits SW00 and SW01 illustrated in FIG. 14.

Figure 16:
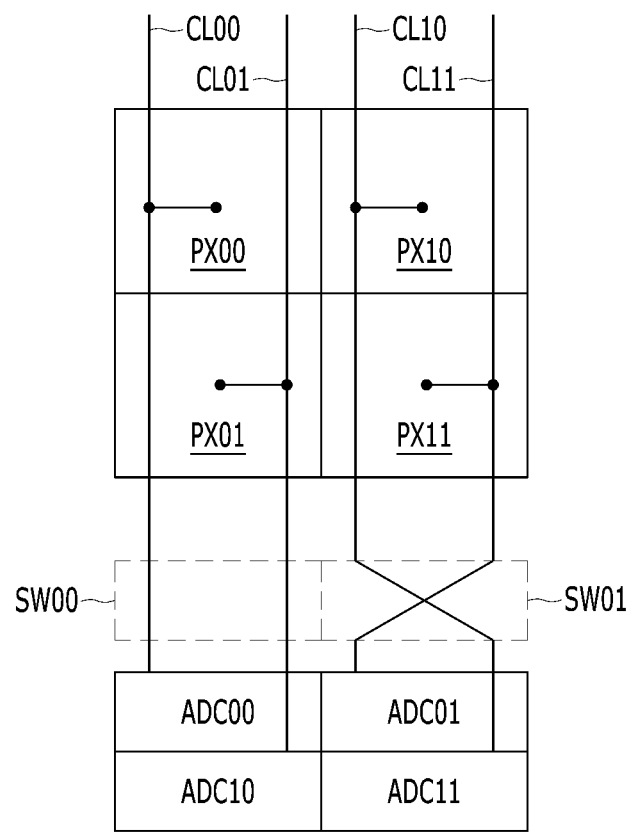
FIGS. 16 to 19 are block diagrams illustrating first and second path change circuits illustrated in FIG. 14.

As illustrated in FIG. 16, the first path change circuit SW00 may change the first and second paths so that the first odd-numbered column line CL00 is coupled to the first readout circuit ADC00 and the first even-numbered column line CL01 is coupled to the second readout circuit ADC10, and the second path change circuit SW01 may change the third and fourth paths so that the second odd-numbered column line CL10 is coupled to the fourth readout circuit ADC11 and the second even-numbered column line CL11 is coupled to the third readout circuit ADC01. For example, the first and second paths may be formed in parallel in the column direction and the third and fourth paths may be formed to cross each other.

Figure 17:
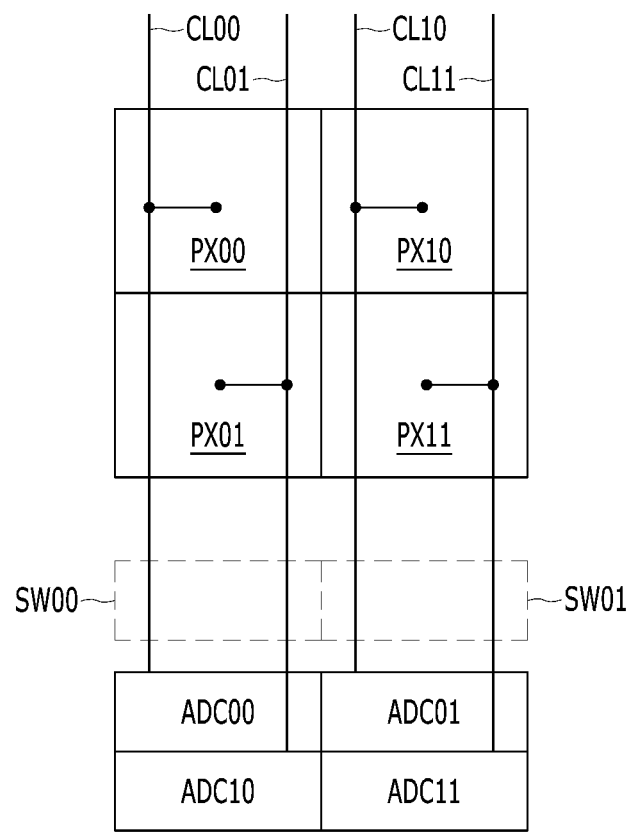

As illustrated in FIG. 17, the first path change circuit SW00 may change the first and second paths so that the first odd-numbered column line CL00 is coupled to the first readout circuit ADC00 and the first even-numbered column line CL01 is coupled to the second readout circuit ADC10, and the second path change circuit SW01 may change the third and fourth paths so that the second odd-numbered column line CL10 is coupled to the third readout circuit ADC01 and the second even-numbered column line CL11 is coupled to the fourth readout circuit ADC11. For example, the first and second paths may be formed in parallel in the column direction and the third and fourth paths may also be formed in parallel in the column direction.

Figure 18:
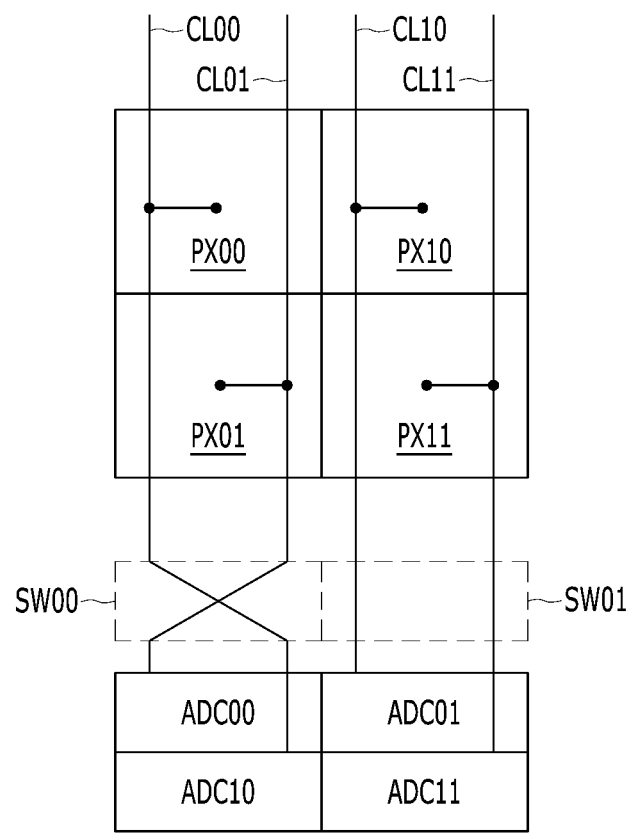

As illustrated in FIG. 18, the first path change circuit SW00 may change the first and second paths so that the first odd-numbered column line CL00 is coupled to the second readout circuit ADC10 and the first even-numbered column line CL01 is coupled to the first readout circuit ADC00, and the second path change circuit SW01 may change the third and fourth paths so that the second odd-numbered column line CL10 is coupled to the third readout circuit ADC01 and the second even-numbered column line CL11 is coupled to the fourth readout circuit ADC11. For example, the first and second paths may be formed to cross each other, and the third and fourth paths may be formed in parallel in the column direction.

Figure 19:
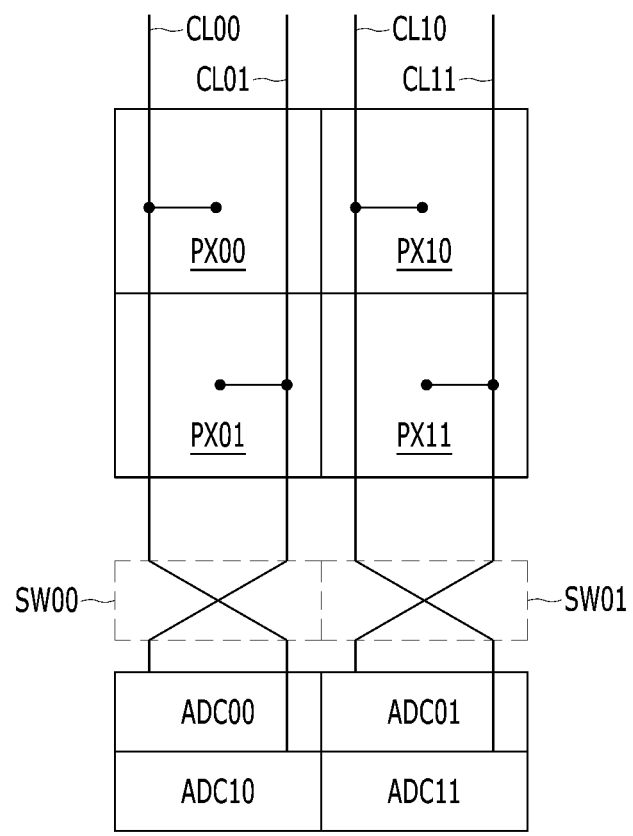

As illustrated in FIG. 19, the first path change circuit SW00 may change the first and second paths so that the first odd-numbered column line CL00 is coupled to the second readout circuit ADC10 and the first even-numbered column line CL01 is coupled to the first readout circuit ADC00, and the second path change circuit SW01 may change the third and fourth paths so that the second odd-numbered column line CL10 is coupled to the fourth readout circuit ADC11 and the second even-numbered column line CL11 is coupled to the third readout circuit ADC01. For example, the first and second paths may be formed to cross each other and the third and fourth paths may also be formed to cross each other.

In the third embodiment, the first to fourth paths may be formed for each unit time as illustrated in any of FIGS. 16 to 19. In other words, in the third embodiment, the first to fourth paths may be randomly changed for each unit time.

In accordance with embodiments of the present disclosure, pixel signals are read out in a form in which some readout circuits in a first readout region and some readout circuits in a second readout region are mixed based on the same row line, thereby reducing mismatches between readout circuits in the first readout region and readout circuits in the second readout region. In addition, in accordance with embodiments of the present disclosure, when first to fourth paths are randomly changed, not regularly changed, the mismatches between the readout circuits in the first readout region and the readout circuits in the second readout region may be further reduced.

As is apparent from the above description, in an image sensing device in accordance with embodiments, the likelihood of a mismatch occurring between readout circuits is reduced, thereby decreasing row fixed pattern noise (RFPN).

While the present disclosure has been illustrated and described with respect to specific embodiments, the disclosed embodiments are not intended to be restrictive. Further, it is noted that the present invention may be achieved in various ways through substitution, change, and modification, as those skilled in the art will recognize in light of the present disclosure, without departing from the spirit and/or scope of the present invention. The present invention is intended to embrace all such substitutions, changes and modifications that fall within the scope of the following claims.

What is claimed is:

1. An image sensing device comprising:
   first to fourth column lines extended in a column direction and disposed sequentially in a row direction;
   a first unit pixel circuit arranged in an intersection of a first row and a first column and coupled to the first column line;
   a second unit pixel circuit arranged in an intersection of a second row and the first column and coupled to the second column line;
   a third unit pixel circuit arranged in an intersection of the first row and a second column and coupled to the fourth column line;
   a fourth unit pixel circuit arranged in an intersection of the second row and the second column and coupled to the third column line;
   first and second readout circuits corresponding to the first and second unit pixel circuits;
   third and fourth readout circuits corresponding to the third and fourth unit pixel circuits;
   a first path change circuit suitable for changing first and second paths between the first and second column lines and the first and second readout circuits for each unit time, based on a first control signal; and
   a second path change circuit suitable for changing third and fourth paths between the third and fourth column lines and the third and fourth readout circuits in the same manner as the first path change circuit for each unit time, based on a second control signal.

2. The image sensing device of claim 1,
   wherein the first path change circuit changes the first and second paths so that the first column line is coupled to the first readout circuit and the second column line is coupled to the second readout circuit during a first unit time, and
   wherein the second path change circuit changes the third and fourth paths so that the third column line is coupled to the third readout circuit and the fourth column line is coupled to the fourth readout circuit during the first unit time.

3. The image sensing device of claim 2,
   wherein the first and second paths are formed in parallel in the column direction, and
   wherein the third and fourth paths are formed in parallel in the column direction.

4. The image sensing device of claim 1,
   wherein the first path change circuit changes the first and second paths so that the first column line is coupled to the second readout circuit and the second column line is coupled to the first readout circuit during a second unit time, and
   wherein the second path change circuit changes the third and fourth paths so that the third column line is coupled to the fourth readout circuit and the fourth column line is coupled to the third readout circuit during the second unit time.

5. The image sensing device of claim 4,
   wherein the first and second paths are formed to cross each other, and
   wherein the third and fourth paths are formed to cross each other.

6. The image sensing device of claim 1, wherein the first and second control signals are the same signal.

7. The image sensing device of claim 1,
   wherein the first and second control signals are controlled for each unit time, and
   wherein the unit time includes two or more row line times or one or more frame times.

8. The image sensing device of claim 1,
   wherein the first and second readout circuits are disposed in the first column, and
   wherein the third and fourth readout circuits are disposed in the second column.

9. An image sensing device comprising:
   first to fourth column lines extended in a column direction and disposed sequentially in a row direction;

a first unit pixel circuit arranged in an intersection of a first row and a first column and coupled to the first column line;

a second unit pixel circuit arranged in an intersection of a second row and the first column and coupled to the second column line;

a third unit pixel circuit arranged in an intersection of the first row and a second column and coupled to the third column line;

a fourth unit pixel circuit arranged in an intersection of the second row and the second column and coupled to the fourth column line;

first and second readout circuits corresponding to the first and second unit pixel circuits;

third and fourth readout circuits corresponding to the third and fourth unit pixel circuits;

a first path change circuit suitable for changing first and second paths between the first and second column lines and the first and second readout circuits for each unit time, based on a first control signal; and a second path change circuit suitable for changing third and fourth paths between the third and fourth column lines and the third and fourth readout circuits for each unit time, based on a second control signal, differently from the first path change circuit.

10. The image sensing device of claim 9, wherein the first path change circuit changes the first and second paths so that the first column line is coupled to the first readout circuit and the second column line is coupled to the second readout circuit during a first unit time, and wherein the second path change circuit changes the third and fourth paths so that the third column line is coupled to the fourth readout circuit and the fourth column line is coupled to the third readout circuit during the first unit time.

11. The image sensing device of claim 10, wherein the first and second paths are formed in parallel in the column direction, and wherein the third and fourth paths are formed to cross each other.

12. The image sensing device of claim 9, wherein the first path change circuit changes the first and second paths so that the first column line is coupled to the second readout circuit and the second column line is coupled to the first readout circuit during a second unit time, and wherein the second path change circuit changes the third and fourth paths so that the third column line is coupled to the third readout circuit and the fourth column line is coupled to the fourth readout circuit during the second unit time.

13. The image sensing device of claim 12, wherein the first and second paths are formed to cross each other, and wherein the third and fourth paths are formed in parallel in the column direction.

14. The image sensing device of claim 9, wherein the first and second control signals are mutually inverted signals.

15. The image sensing device of claim 9, wherein the first and second control signals are controlled for each unit time, and wherein the unit time includes two or more row line times or one or more frame times.

16. The image sensing device of claim 9, wherein the first and second readout circuits are disposed in the first column, and wherein the third and fourth readout circuits are disposed in the second column.

17. An image sensing device comprising:

first to fourth column lines extended in a column direction and disposed sequentially in a row direction;

a first unit pixel circuit arranged in an intersection of a first row and a first column and coupled to the first column line;

a second unit pixel circuit arranged in an intersection of a second row and the first column and coupled to the second column line;

a third unit pixel circuit arranged in an intersection of the first row and a second column and coupled to the third column line;

a fourth unit pixel circuit arranged in an intersection of the second row and the second column and coupled to the fourth column line;

first and second readout circuits corresponding to the first and second unit pixel circuits;

third and fourth readout circuits corresponding to the third and fourth unit pixel circuits;

a first path change circuit suitable for changing first and second paths between the first and second column lines and the first and second readout circuits based on a first control signal so that the first and second unit pixel circuits are coupled to the first and second readout circuits according to a first relationship during a first unit time; and a second path change circuit suitable for changing third and fourth paths between the third and fourth column lines and the third and fourth readout circuits based on a second control signal so that the third and fourth unit pixel circuits are randomly coupled to the third and fourth readout circuits according to any one of the first relationship and a second relationship during the first unit time.

18. The image sensing device of claim 17, wherein the first path change circuit further changes the first and second paths based on the first control signal so that the first and second unit pixel circuits are coupled to the first and second readout circuits according to the second relationship during a second unit time, and wherein the second path change circuit further changes or maintains the third and fourth paths based on the second control signal so that the third and fourth unit pixel circuits are randomly coupled to the third and fourth readout circuits according to any one of the first relationship and the second relationship during the second unit time.

19. The image sensing device of claim 17, further comprising:

a first switching element suitable for outputting, based on a third control signal, an inverted version of the first control signal as the second control signal; and a second switching element suitable for outputting, based on an inverted version of the third control signal, the first control signal as the second control signal.

20. The image sensing device of claim 19, wherein the first control signal is regularly controlled for each unit time, wherein the third control signal is randomly controlled for each unit time, and wherein the second control signal is randomly controlled for each unit time.

21. The image sensing device of claim 17,
wherein the first and second readout circuits are disposed in the first column, and
wherein the third and fourth readout circuits are disposed in the second column.

* * * * *